(12) United States Patent
Fukuda (10) Patent No.: US 7,079,180 B1
(45) Date of Patent: Jul. 18, 2006

(54) ELECTRONIC CAMERA

(75) Inventor: Tsuyoshi Fukuda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 982 days.

(21) Appl. No.: 09/580,892

(22) Filed: May 30, 2000

(30) Foreign Application Priority Data

Jun. 4, 1999 (JP) .................................. 11-158063

(51) Int. Cl.
*H04N 9/73* (2006.01)
(52) U.S. Cl. ..................................... 348/223.1; 348/345
(58) Field of Classification Search ............. 348/223.1, 348/222.1, 345, 346, 348, 349, 354; 358/516, 358/29

See application file for complete search history.

(56) References Cited

U.S. PATENT DOCUMENTS

| | | | | |
|---|---|---|---|---|
| 4,771,307 A | * | 9/1988 | Kuno et al. | 396/98 |
| 4,994,843 A | * | 2/1991 | Kitazawa | 396/123 |
| 5,055,933 A | * | 10/1991 | Hidaka | 348/356 |
| 5,185,669 A | * | 2/1993 | Kato | 348/223.1 |
| 5,223,921 A | * | 6/1993 | Haruki et al. | 348/655 |
| 5,260,774 A | * | 11/1993 | Takayama | 348/655 |
| 5,319,449 A | * | 6/1994 | Saito et al. | 348/223.1 |
| 5,619,260 A | * | 4/1997 | Miyadera | 348/223.1 |
| 5,995,142 A | * | 11/1999 | Matsufune | 348/223.1 |
| 5,995,144 A | * | 11/1999 | Sasakura | 348/350 |
| 6,493,027 B1 | * | 12/2002 | Ohta et al. | 348/220.1 |
| 6,525,764 B1 | * | 2/2003 | Kondo et al. | 348/96 |

FOREIGN PATENT DOCUMENTS

JP 06-098337 4/1994

* cited by examiner

*Primary Examiner*—James J. Groody
*Assistant Examiner*—Heather R. Jones
(74) *Attorney, Agent, or Firm*—Cowan, Liebowitz & Latman, P.C.

(57) ABSTRACT

In an electronic camera, during a photographing operation for photographing a white sheet of paper or the like to obtain white balance data, a plurality of distance measuring points provided in an automatic focusing mechanism are restricted to only the one that is located at a central portion of the image plane. Further, a determination level used for determining an in-focus state in the automatic focusing mechanism is set lower than where an ordinary object is photographed. Accordingly, the photographing operation for obtaining white balance data can be completed for a short time. Furthermore, if the automatic focusing operation itself is inhibited during the photographing operation for photographing a white sheet of paper or the like to obtain white balance data, that photographing operation can be completed for a very short time.

6 Claims, 9 Drawing Sheets

ELECTRONIC CAMERA

BACKGROUND OF THE INVENTION

1. Field of the Invention

The present invention relates to an electronic camera having an automatic focusing (hereinafter referred to as AF) function and a white balance correcting function.

2. Description of Related Art

Heretofore, in an electronic camera arranged to pick up an image of an object by using an image sensor, such as a CCD, and to record the picked-up image on a recording medium, there has been known a technical method of, when correcting white balance (hereinafter referred to as WB), photographing a white sheet of paper or the like while framing it in the full range of a viewfinder field under a light source at the photographing place, and working a WB correction circuit during an ordinary photographing operation by using WB data obtained by photographing the white sheet of paper or the like.

While, in the above-mentioned method, it is necessary to photograph a white sheet of paper or the like so as to obtain WB data, a white sheet of paper having no contrast is an object that is very unsuitable for a focusing operation in respect of the AF function, which is widely employed in recent cameras. In particular, in a case where an AF mechanism is provided with a number of distance measuring points, such an action would be performed that, if a central distance measuring point has been judged to be unsuitable for the AF operation as the contrast thereof is low, the target for the AF operation shifts to another distance measuring point to repeat an AF computation, and, because the similar situation occurs also there, the target for the AF operation also shifts to a still another distance measuring point to repeat the AF computation. As a result, there occurs an inconvenience that the AF operation is not readily finished, causing a photographing operation to take a long time.

BRIEF SUMMARY OF THE INVENTION

It is an object of the invention to provide an electronic camera capable of preventing a photographing operation on a white sheet of paper or the like for obtaining white balance data from taking a long time due to a long-time automatic focusing operation.

To attain the above object, in accordance with an aspect of the invention, there is provided an electronic camera, which comprises white balance correcting means for correcting white balance of a picked-up image on the basis of white balance data obtained by beforehand picking up an image of a predetermined object, an automatic focusing mechanism having a plurality of distance measuring points on an image picking-up plane and arranged to automatically perform a focusing operation by detecting a high-frequency component of a picked-up image signal while using the plurality of distance measuring points, and control means for, when picking up an image of the predetermined object so as to obtain white balance data to be used for the white balance correcting means, controlling the operation of the automatic focusing mechanism by causing the automatic focusing mechanism to selectively use, from among the plurality of distance measuring points on the image picking-up plane, one predetermined distance measuring point or a predetermined number of distance measuring points that are smaller in number than the plurality of distance measuring points.

In accordance with another aspect of the invention, there is provided an electronic camera, which comprises white balance correcting means for correcting white balance of a picked-up image on the basis of white balance data obtained by beforehand picking up an image of a predetermined object, an automatic focusing mechanism arranged to automatically perform a focusing operation by detecting a high-frequency component of a picked-up image signal, and control means for, when picking up an image of the predetermined object so as to obtain white balance data to be used for the white balance correcting means, inhibiting the operation of the automatic focusing mechanism.

In accordance with a further aspect of the invention, there is provided an electronic camera, which comprises white balance correcting means for correcting white balance of a picked-up image on the basis of white balance data obtained by beforehand picking up an image of a predetermined object, an automatic focusing mechanism having a first method of automatically performing a focusing operation by detecting a high-frequency component of a picked-up image signal and a second method of automatically performing a focusing operation on the basis of distance information measured correspondingly with a period of time from emission of predetermined light until reception of reflection of the predetermined light, and control means for, when picking up an image of the predetermined object so as to obtain white balance data to be used for the white balance correcting means, controlling the operation of the automatic focusing mechanism by causing the automatic focusing mechanism to select the second method.

In accordance with a still further aspect of the invention, there is provided a control method for controlling an electronic camera having an automatic focusing mechanism having a plurality of distance measuring points on an image picking-up plane and arranged to automatically perform a focusing operation by detecting a high-frequency component of a picked-up image signal while using the plurality of distance measuring points, the control method comprising the steps of correcting white balance of a picked-up image on the basis of white balance data obtained by beforehand picking up an image of a predetermined object, and, when picking up an image of the predetermined object so as to obtain the white balance data, controlling the operation of the automatic focusing mechanism by causing the automatic focusing mechanism to selectively use, from among the plurality of distance measuring points on the image picking-up plane, one predetermined distance measuring point or a predetermined number of distance measuring points that are smaller in number than the plurality of distance measuring points.

In accordance with a still further aspect of the invention, there is provided a control method for controlling an electronic camera having an automatic focusing mechanism arranged to automatically perform a focusing operation by detecting a high-frequency component of a picked-up image signal, the control method comprising the steps of correcting white balance of a picked-up image on the basis of white balance data obtained by beforehand picking up an image of a predetermined object, and, when picking up an image of the predetermined object so as to obtain the white balance data, inhibiting the operation of the automatic focusing mechanism.

In accordance with a still further aspect of the invention, there is provided a control method for controlling an electronic camera having an automatic focusing mechanism having a first method of automatically performing a focusing operation by detecting a high-frequency component of a picked-up image signal and a second method of automatically performing a focusing operation on the basis of distance information measured correspondingly with a period of time from emission of predetermined light until reception of reflection of the predetermined light, the control method comprising the steps of correcting white balance of a picked-up image on the basis of white balance data obtained by beforehand picking up an image of a predetermined object, and, when picking up an image of the predetermined object so as to obtain the white balance data, controlling the operation of the automatic focusing mechanism by causing the automatic focusing mechanism to select the second method.

In accordance with a still further aspect of the invention, there is provided a storage medium which stores therein a program for executing a process for controlling an electronic camera having an automatic focusing mechanism having a plurality of distance measuring points on an image picking-up plane and arranged to automatically perform a focusing operation by detecting a high-frequency component of a picked-up image signal while using the plurality of distance measuring points, the process comprising correcting white balance of a picked-up image on the basis of white balance data obtained by beforehand picking up an image of a predetermined object, and, when picking up an image of the predetermined object so as to obtain the white balance data, controlling the operation of the automatic focusing mechanism by causing the automatic focusing mechanism to selectively use, from among the plurality of distance measuring points on the image picking-up plane, one predetermined distance measuring point or a predetermined number of distance measuring points that are smaller in number than the plurality of distance measuring points.

In accordance with a still further aspect of the invention, there is provided a storage medium which stores therein a program for executing a process for controlling an electronic camera having an automatic focusing mechanism arranged to automatically perform a focusing operation by detecting a high-frequency component of a picked-up image signal, the process comprising correcting white balance of a picked-up image on the basis of white balance data obtained by beforehand picking up an image of a predetermined object, and, when picking up an image of the predetermined object so as to obtain the white balance data, inhibiting the operation of the automatic focusing mechanism.

In accordance with a still further aspect of the invention, there is provided a storage medium which stores therein a program for executing a process for controlling an electronic camera having an automatic focusing mechanism having a first method of automatically performing a focusing operation by detecting a high-frequency component of a picked-up image signal and a second method of automatically performing a focusing operation on the basis of distance information measured correspondingly with a period of time from emission of predetermined light until reception of reflection of the predetermined light, the process comprising correcting white balance of a picked-up image on the basis of white balance data obtained by beforehand picking up an image of a predetermined object, and, when picking up an image of the predetermined object so as to obtain the white balance data, controlling the operation of the automatic focusing mechanism by causing the automatic focusing mechanism to select the second method.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

FIRST EMBODIMENT

Figure 1:
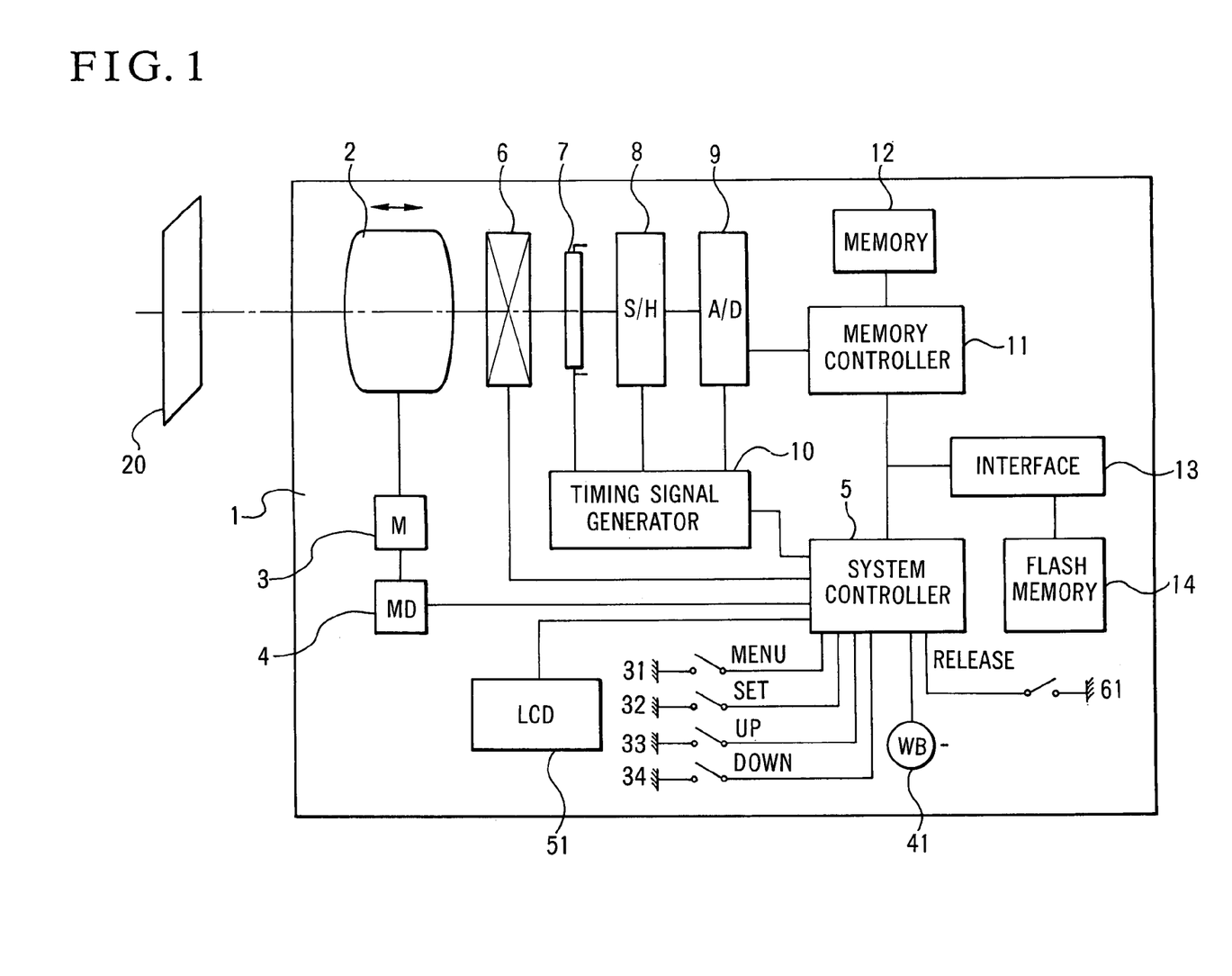
FIG. 1 is a block diagram showing the arrangement of essential parts of an electronic camera according to a first embodiment of the invention.

FIG. 1 is a block diagram showing the arrangement of essential parts of an electronic camera according to a first embodiment of the invention.

The electronic camera 1 has a photographic lens 2. Light received at the photographic lens 2 is supplied to a solid-state image sensor 7, such as a CCD, through a light-quantity control part 6 which is composed of an iris, a shutter, etc., and is then photoelectrically converted by the solid-state image sensor 7. A white sheet 20 is prepared for obtaining white balance (WB) data.

A lens driving motor 3 is arranged to drive the photographic lens 2 under the control of a motor control part 4 so as to perform an automatic focusing (AF) operation on the basis of the output of the solid-state image sensor 7. In the first embodiment, for the AF operation, there is employed a passive AF method in which the position of the photographic lens 2 is controlled in such a way as to make the level of a high-frequency component of the output of the solid-state image sensor 7 highest (make the sharpness of an image highest).

A system controller 5, which is composed of a microcomputer or the like, controls the various parts of the electronic camera, for example, according to a predetermined photographing sequence.

A sample-and-hold circuit 8 samples and holds the output of the solid-state image sensor 7 at a predetermined period. Then, the output of the sample-and-hold circuit 8 is A/D-converted by an A/D converter 9.

A timing signal generator 10 generates a timing signal for driving the solid-state image sensor 7, a sample-and-hold pulse signal for driving the sample-and-hold circuit 8, an A/D conversion pulse signal for driving the A/D converter 9, etc.

A memory controller 11 controls a writing action for writing in a memory 12, which is composed of a DRAM or the like, a reading action for reading from the memory 12, etc.

An interface circuit 13 controls communication between the electronic camera and a recording medium 14, which is composed of a flash memory or the like.

Figure 2:
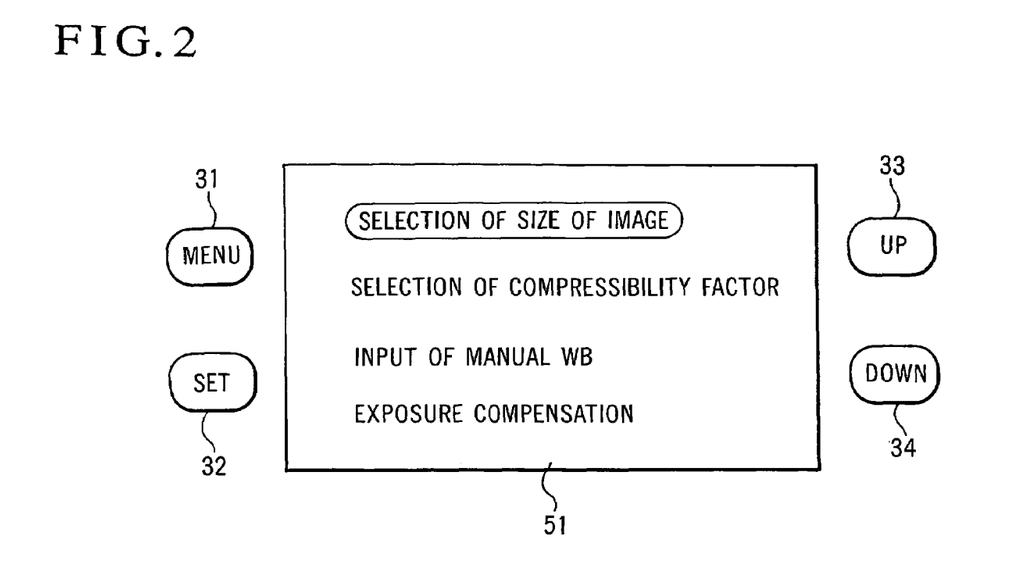
FIG. 2 is a schematic diagram showing one example of a menu displayed on a display device of the electronic camera according to the first embodiment of the invention.

FIG. 2 shows one example of a menu displayed for executing the various functions of the electronic camera 1. The menu is displayed, as a menu picture, on a display device 51, which is composed of a liquid crystal display or the like.

A group of switches 31 to 34 are provided for the menu. The menu switch 31 is provided for causing the menu to be displayed. The setting switch 32 is provided for deciding on an item selected in the menu. The up switch 33 is provided for changing the selected item to an item located at the just upper position among a plurality of items as displayed. The down switch 34 is provided for changing the selected item to an item located at the just lower position among a plurality of items as displayed.

Figure 4:
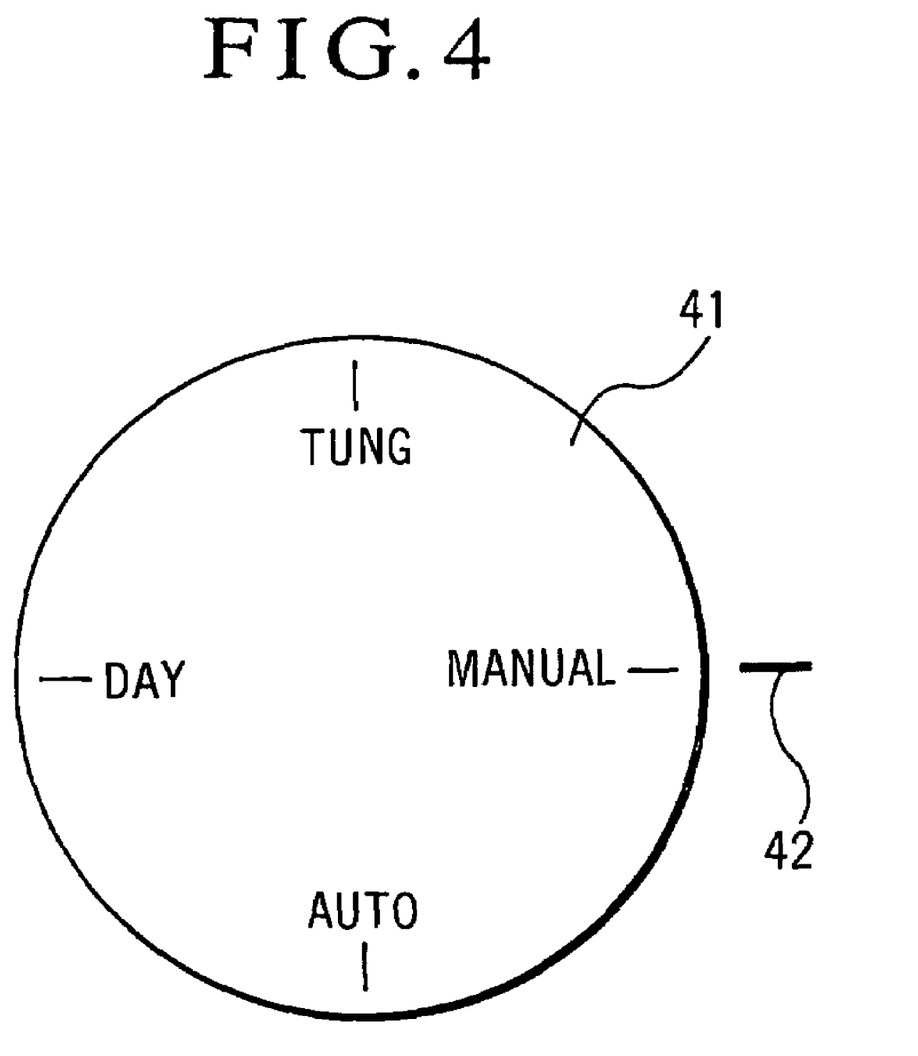
FIG. 4 is a schematic diagram showing one example of a white balance selection switch of the electronic camera according to the first embodiment of the invention.

FIG. 4 is a schematic diagram showing, in an enlarged fashion, a white balance selection switch 41 of the dial type. The white balance selection switch 41 is provided for selecting one of white balance control modes, including a manual (MANUAL) mode, a daylight (DAY) mode, a tungsten (TUNG) mode, and an automatic (AUTO) mode. When the daylight mode or the tungsten mode is selected, the white balance of a photographed image is corrected on the basis of a correction value which has been beforehand prepared correspondingly with the associated light source. When the automatic mode is selected, the white balance of a photographed image is corrected on the basis of a correction value which has been obtained by a predetermined computation from the photographed image. When the manual mode is selected, the white balance of a photographed image is corrected on the basis of white balance (WB) data which has been inputted by the photographer according to a course of action to be described later. An indication line 42 is disposed adjacent to the white balance selection switch 41 for indicating the position of the selected mode.

A release switch 61 is provided for setting the start of an image picking-up operation of the electronic camera 1.

Figure 5:
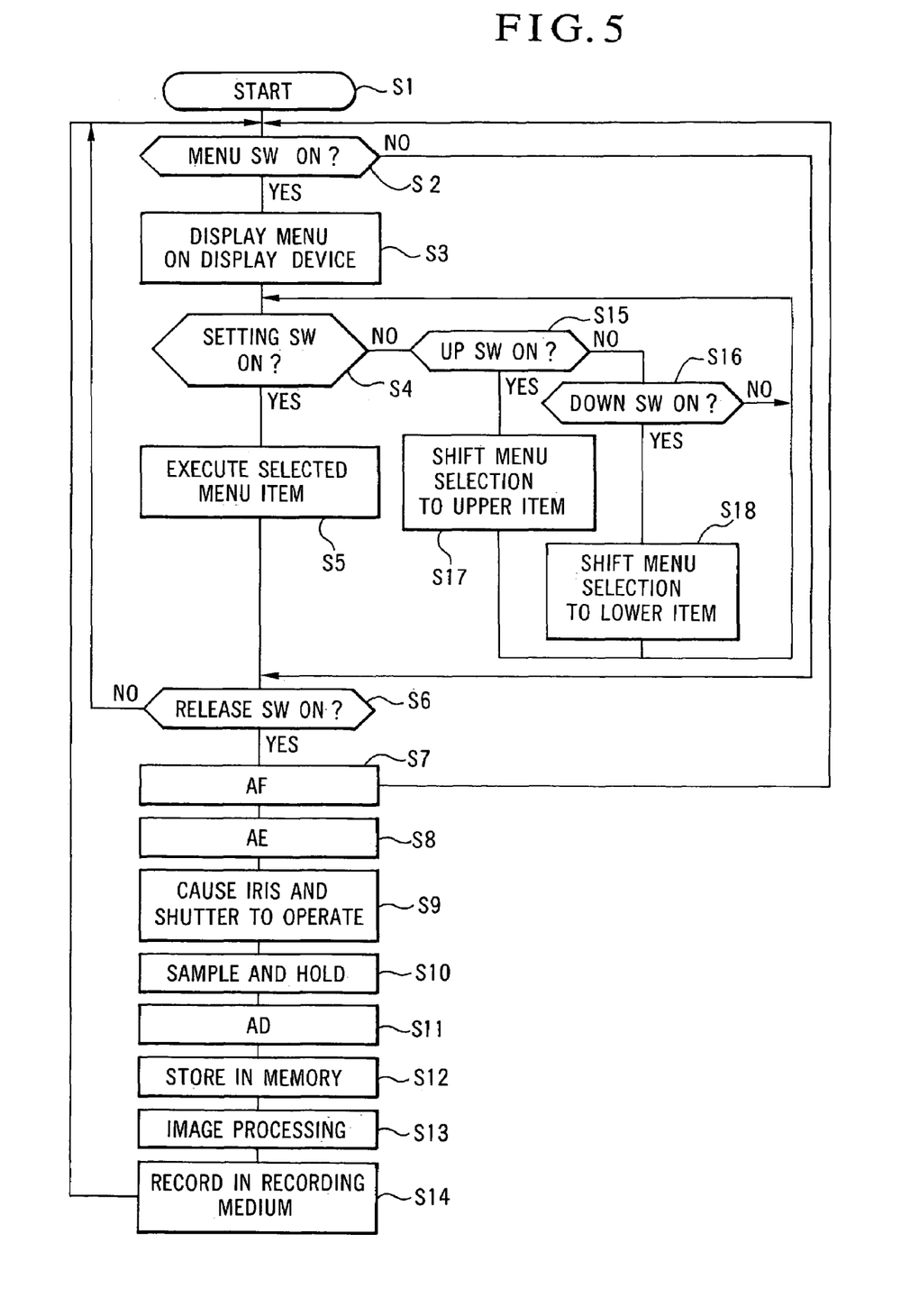
FIG. 5 is a flow chart showing the flow of a photographing operation of the electronic camera according to the first embodiment of the invention.

FIG. 5 is a flow chart showing the flow of a photographing operation of the electronic camera 1.

Referring to FIG. 5, when the power supply of the electronic camera 1 is turned on (step S1), a check is made to find if the menu switch 31 is turned on (step S2). If it is found that the menu switch 31 is not turned on, the flow proceeds to step S6, which is to be described later.

On the other hand, if it is found that the menu switch 31 is turned on, the display device 51 is caused to display, for example, a menu for executing the various functions of the electronic camera 1, as shown in FIG. 2, so as to urge the photographer to select one item from among a plurality of items in the menu (step S3). Incidentally, as the content of the menu, a plurality of items or one item including at least "input of manual WB" is displayed. Further, when the menu is displayed, in a default state, the item located uppermost, i.e., "selection of size of image" in the example shown in FIG. 2, is displayed in the selected state. If an item other than "selection of size of image" has been selected for the last time, the item selected for the last time is displayed in the selected state. In the case of the first embodiment, the selected item is displayed in the state of being surrounded by an oblong circle. Incidentally, various methods are conceivable as the method of displaying the selected item, for example, a method of encircling the item as in the first embodiment, a method of brightening the color of the item, a method of changing the color of the item, etc.

Next, a check is made to find if the setting switch 32 is turned on (step S4), so as to confirm whether the menu item as currently selected is the one that the photographer desires to set. If it is found that the setting switch 32 is turned on, the flow proceeds to step S5, where the processing corresponding to the selected menu item is executed.

If it is found that the setting switch 32 is not turned on, then, a check is made for the state of the up switch 33 (step S15). If it is found that the up switch 33 is turned on, the selection of the menu item is shifted to an item located at the just upper position (step S17). Then, the flow returns to step S4. If it is found in step S15 that the up switch 33 is not turned on, then, a check is made for the state of the down switch 34 (step S16). If it is found that the down switch 34 is turned on, the selection of the menu item is shifted to an item located at the just lower position (step S18). Then, the flow returns to step S4. If it is found in step S16 that the down switch 34 is not turned on, the flow returns to step S4 without passing through any step. Then, the flow waits while repeating the above processing until any one of the switches 32, 33 and 34 is operated.

Figure 6:
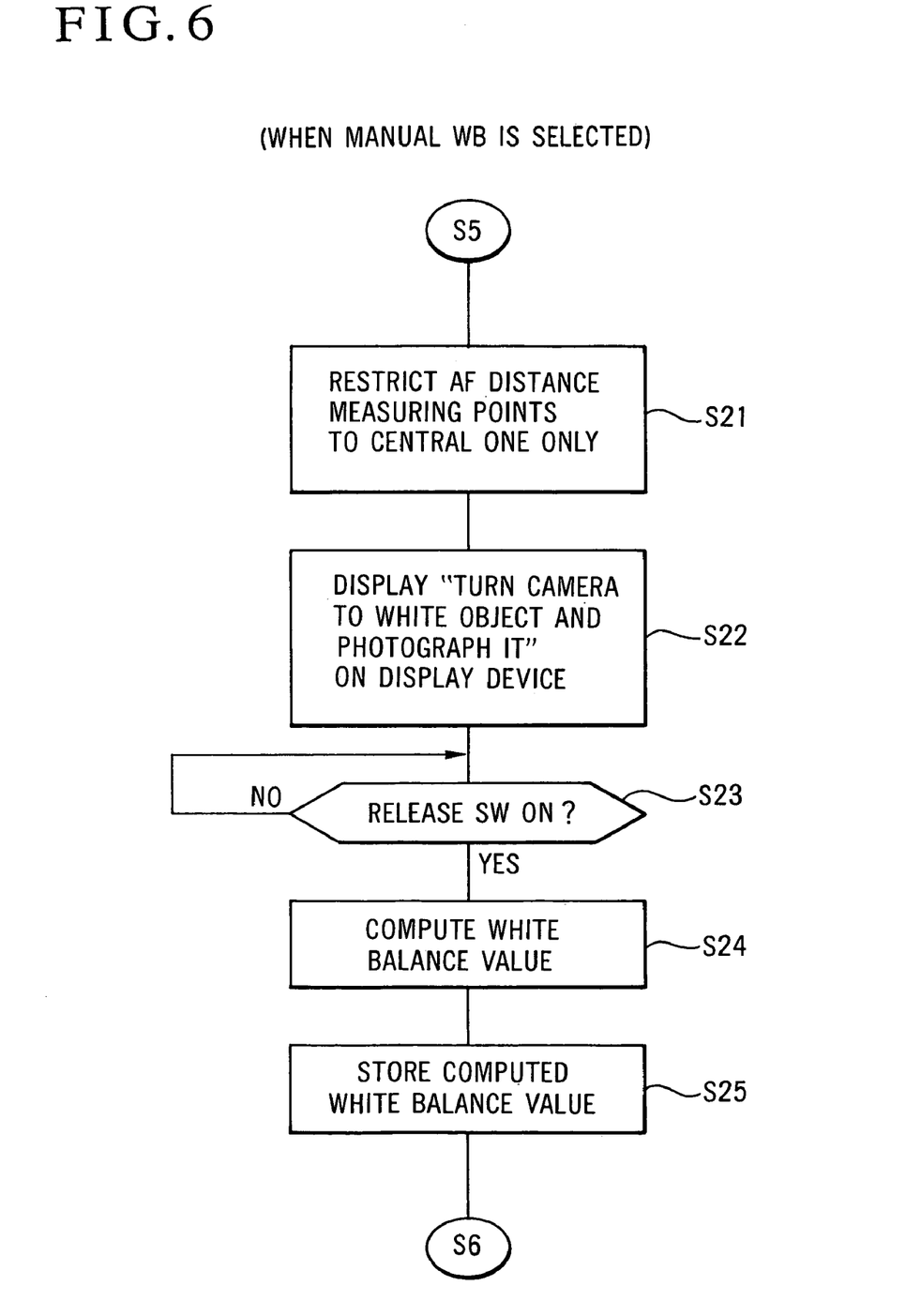
FIG. 6 is a flow chart showing the flow of a manual white balance inputting process in the electronic camera according to the first embodiment of the invention.

FIG. 6 is a flow chart showing the processing procedure to be executed when the item "input of manual WB" is selected in the menu picture.

With the item "input of manual WB" selected, when the setting switch 32 is turned on, the electronic camera according to the first embodiment restricts a plurality of AF distance measuring points to only the one that is located at a central portion of the image plane (step S21).

Figure 3:
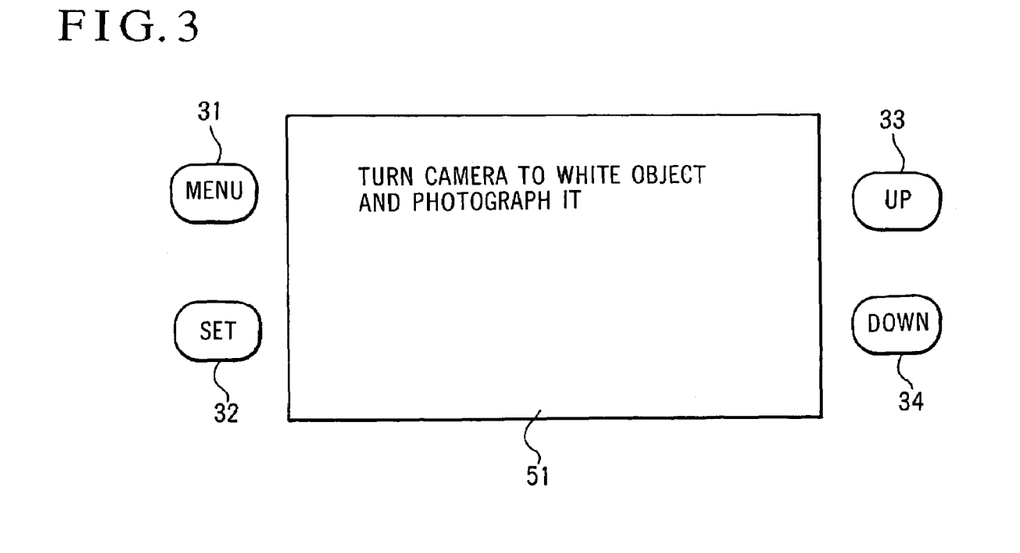
FIG. 3 is a schematic diagram showing one example of a display appearing on the display device of the electronic camera according to the first embodiment of the invention.

Next, the display device 51 is caused to display, for example, such a message as "turn camera to white object and photograph it", as shown in FIG. 3, so as to urge the photographer to input WB data (step S22). In this instance, the photographer puts a white sheet of paper or the like in front of the photographic lens 2 of the electronic camera 1 under photographic light, and photographs the white sheet of paper or the like by depressing the release switch 61.

In the first embodiment, since the AF distance measuring points are restricted to only the one that is located at a central portion of the image plane, the AF operation is finished considerably quickly, even if a white sheet of paper or the like having low contrast is photographed. Accordingly, the photographing operation for obtaining WB data can be completed for a short time. If the AF operation is made to work at all the distance measuring points, as in the conventional camera, the AF operation is not readily finished, causing a photographing operation to take a long time.

If it is found in step S23 that the release switch 61 is turned on, a WB value to be used as a reference value for white balance is computed from a picked-up white image (step S24). Then, the computed WB value is stored in the memory 12 (step S25).

After the above processing is finished, the flow returns to the flow chart of FIG. 5. In step S6, the flow waits the release switch 61 to be turned on for the ordinary photographing operation.

If it is found in step S6 that the release switch 61 is turned on, the electronic camera 1 performs the ordinary photographing operation.

First, the AF operation is performed by driving the photographic lens 2 with the motor 3 (step S7).

Next, an exposure value to be controlled is decided (step S8), and the light-quantity control part 6 is operated on the basis of the exposure value (step S9).

Light received through the photographic lens 2 is converted by the solid-state image sensor 7 into an electrical signal, which is then sampled and held by the sample-and-hold circuit 8 (step S10). After that, the electrical signal is converted into a digital image signal by the A/D converter 9 (step S11).

The digital image signal is temporarily stored into the memory 12 through the memory controller 11 (step S12). After that, the image signal is subjected to the predetermined image processing, including the correction of white balance (step S13).

The correction of white balance is performed according to the mode selected by the photographer with the WB selection switch 41. Thus, if the daylight mode or the tungsten mode is selected by the photographer, the correction of white balance is performed on the basis of a correction value that has been beforehand determined under daylight or tungsten light. If the automatic mode is selected, a correction value is obtained according to a predetermined computation from an image obtained by the ordinary photographing operation, and the correction of white balance is performed on the basis of the thus-obtained correction value. Only if the manual mode is selected by the photographer, the correction of white balance is performed on the basis of WB data obtained according to the above-described procedure.

The image signal, which has been subjected to the image processing in step S13, is recorded in the recording medium 14 through the interface circuit 13 (step S14).

With the above process performed, the photographing sequence for one time is finished.

According to the first embodiment described in the foregoing, since, during a photographing operation for obtaining WB data, the AF distance measuring points are restricted to only the one that is located at a central portion of the image plane, the AF operation is finished considerably quickly, as compared with a case where the AF operation is made to work at all the distance measuring points. Accordingly, the photographing operation for obtaining WB data can be completed for a short time.

Incidentally, while, in the above-described first embodiment, the AF operation is performed using one distance measuring point during a photographing operation for obtaining manual WB data, the first embodiment is not limited to this arrangement. The object of the first embodiment may be attained also by using a predetermined number of distance measuring points that are smaller in number than the distance measuring points used during a photographing operation for photographing an ordinary object.

SECOND EMBODIMENT

Figure 7:
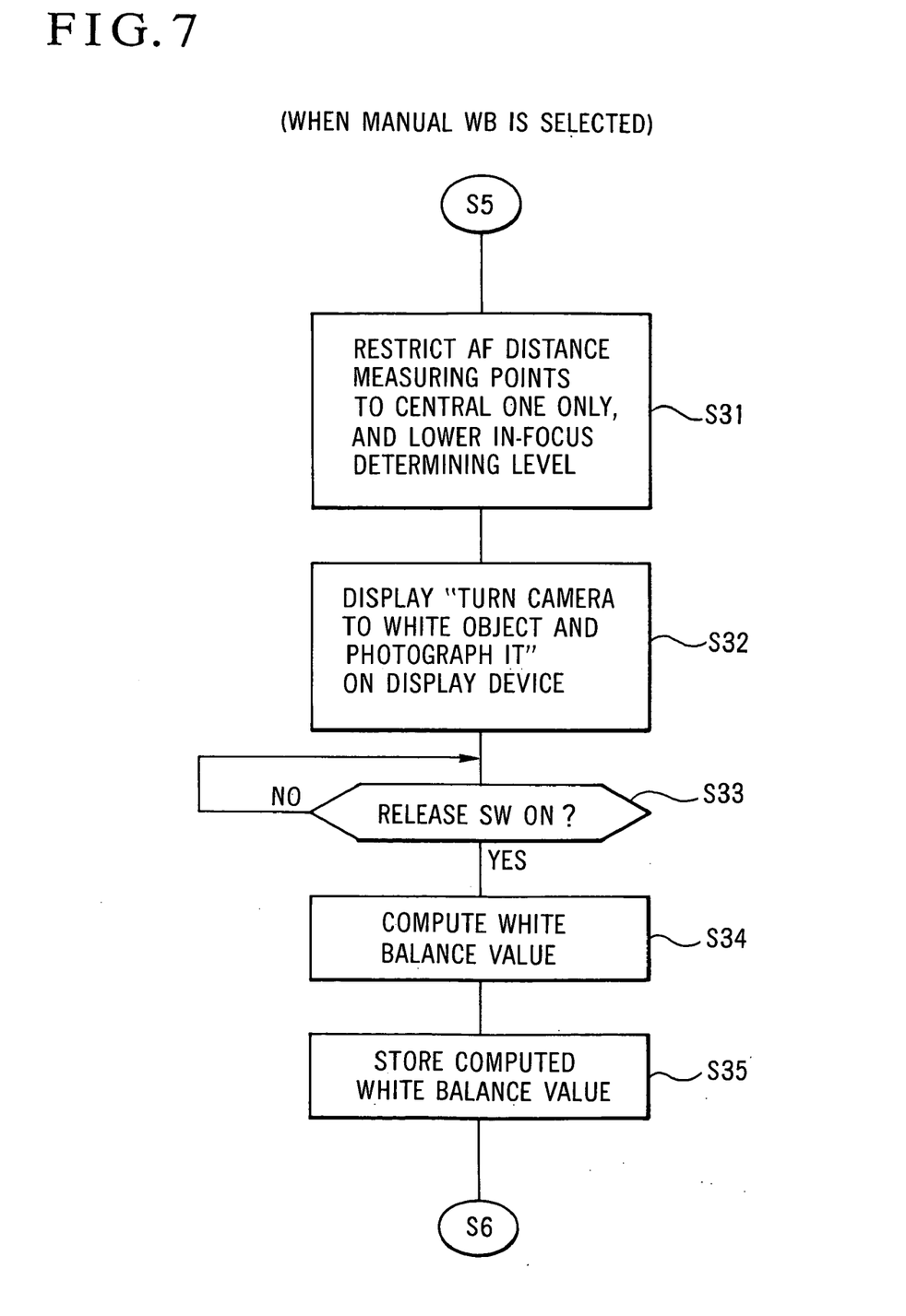
FIG. 7 is a flow chart showing the flow of a manual white balance inputting process in an electronic camera according to a second embodiment of the invention.

FIG. 7 is a flow chart showing the flow of a manual white balance inputting process in an electronic camera according to a second embodiment of the invention.

In the second embodiment, the arrangement of main parts of the electronic camera and the main flow of the photographing operation are the same as those shown in FIGS. 1 and 5. Therefore, reference is made to FIGS. 1 and 5 also in the description here. The parts similar to those in the first embodiment are omitted from the description.

Referring to the flow chart of FIG. 5, with the item "input of manual WB" in the menu selected, when the setting switch 32 is turned on (step S4), the electronic camera 1 according to the second embodiment causes the flow to shift to the flow chart of FIG. 7. In FIG. 7, the electronic camera 1 restricts a plurality of AF distance measuring points to only the one that is located at a central portion of the image plane, and, at the same time, sets the in-focus determining level lower than where an ordinary object is photographed (step S31).

Incidentally, in the second embodiment, as in the first embodiment, the position of the photographic lens 2 is controlled in such a way as to make the level of a high-frequency component of the output of the solid-state image sensor 7 highest. In the case of such a focusing method, the determination of an in-focus state is performed by making comparison with a high-frequency component obtained at the position in the vicinity of the position of the photographic lens 2 where a high-frequency component reaches a peak, so as to find the steepness of a high-frequency component. If the degree of the steepness is more than a predetermined value, it is determined that an in-focus state has been attained, and if not, it is determined that an in-focus state has not been attained, as being within a range of error. In other words, the phrase "sets the in-focus determining level lower" mentioned in the second embodiment means setting such that, even if the degree of the steepness of a high-frequency component is low, it is determined that an in-focus state has been attained.

Next, the display device 51 is caused to display, for example, such a message as "turn camera to white object and photograph it", as shown in FIG. 3, so as to urge the photographer to input WB data (step S32). In this instance, the photographer puts a white sheet of paper or the like in front of the photographic lens 2 of the electronic camera 1 under photographic light, and photographs the white sheet of paper or the like by depressing the release switch 61.

As described above, in the second embodiment, since the AF distance measuring points are restricted to only the one that is located at a central portion of the image plane, and, at the same time, the in-focus determining level is lowered, the AF operation is finished more quickly than in the above-mentioned first embodiment. Accordingly, the photographing operation for obtaining WB data can be completed for a shorter time.

If it is found in step S33 that the release switch 61 is turned on, a WB value to be used as a reference value for white balance is computed from a picked-up white image (step S34). Then, the computed WB value is stored in the memory 12 (step S35).

After the above processing is finished, the flow returns to the flow chart of FIG. 5.

THIRD EMBODIMENT

Figure 8:
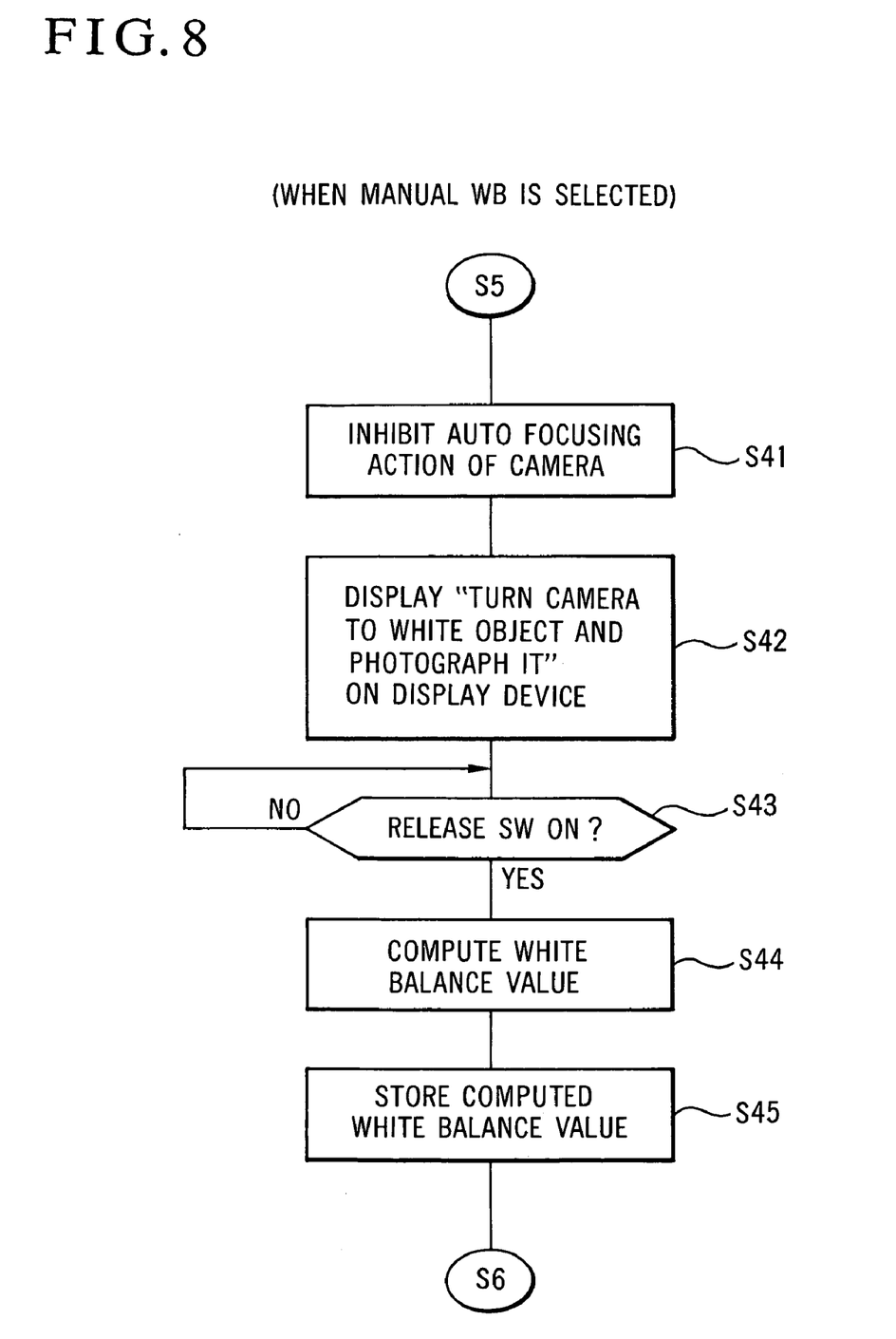
FIG. 8 is a flow chart showing the flow of a manual white balance inputting process in an electronic camera according to a third embodiment of the invention.

FIG. 8 is a flow chart showing the flow of a manual white balance inputting process in an electronic camera according to a third embodiment of the invention.

In the third embodiment, the arrangement of main parts of the electronic camera and the main flow of the photographing operation are the same as those shown in FIGS. 1 and 5.

Therefore, reference is made to FIGS. 1 and 5 also in the description here. The parts similar to those in the first embodiment are omitted from the description.

Referring to the flow chart of FIG. 5, with the item "input of manual WB" in the menu selected, when the setting switch 32 is turned on (step S4), the electronic camera 1 according to the third embodiment causes the flow to shift to the flow chart of FIG. 8. In FIG. 8, first, the AF operation itself of the electronic camera 1 is inhibited (step S41).

Next, the display device 51 is caused to display, for example, such a message as "turn camera to white object and photograph it", as shown in FIG. 3, so as to urge the photographer to input WB data (step S42). In this instance, the photographer puts a white sheet of paper or the like in front of the photographic lens 2 of the electronic camera 1 under photographic light, and photographs the white sheet of paper or the like by depressing the release switch 61.

As has been described above, according to the third embodiment, since the AF operation itself is inhibited, the AF operation is not performed at all, so that the photographing operation for obtaining WB data can be performed for a very short time. In essence, when photographing a white sheet of paper or the like, the focusing operation is unnecessary, and the distance between the lens and the white sheet of paper or the like is essentially out of question. However, in a case where the AF operation is in operation, it is impossible to take a photograph until the AF operation is finished, and, in addition, it is necessary to place a white sheet of paper or the like at a position distant enough to make it possible to focus on the white sheet of paper or the like. Therefore, the photographing operation takes much time, and, at the same time, there is a problem that it is necessary to prepare a relatively large white sheet of paper or the like. On the contrary, according to the third embodiment, since it is possible to photograph a white sheet of paper or the like at a considerably near distance, it is unnecessary for the photographer to carry a large white sheet of paper or the like.

If it is found in step S43 that the release switch 61 is turned on, a WB value to be used as a reference value for white balance is computed from a picked-up white image (step S44). Then, the computed WB value is stored in the memory 12 (step S45).

After the above processing is finished, the flow returns to the flow chart of FIG. 5.

FOURTH EMBODIMENT

According to a fourth embodiment of the invention, the invention is applied to an electronic camera having, in addition to the construction of the first embodiment, a distance measuring sensor arranged to measure a distance to the object by detecting a period of time from the emission of an infrared ray until the reception of reflection of the infrared ray from the object, and having a hybrid-type automatic focusing mechanism capable of selectively using a passive AF method in which focusing is controlled by detecting the peak of a high-frequency component of a picked-up image signal outputted from the image sensor 7, as in the first embodiment, and an active AF method in which a focusing operation is performed by using distance information obtained by the above distance measuring sensor.

Figure 9:
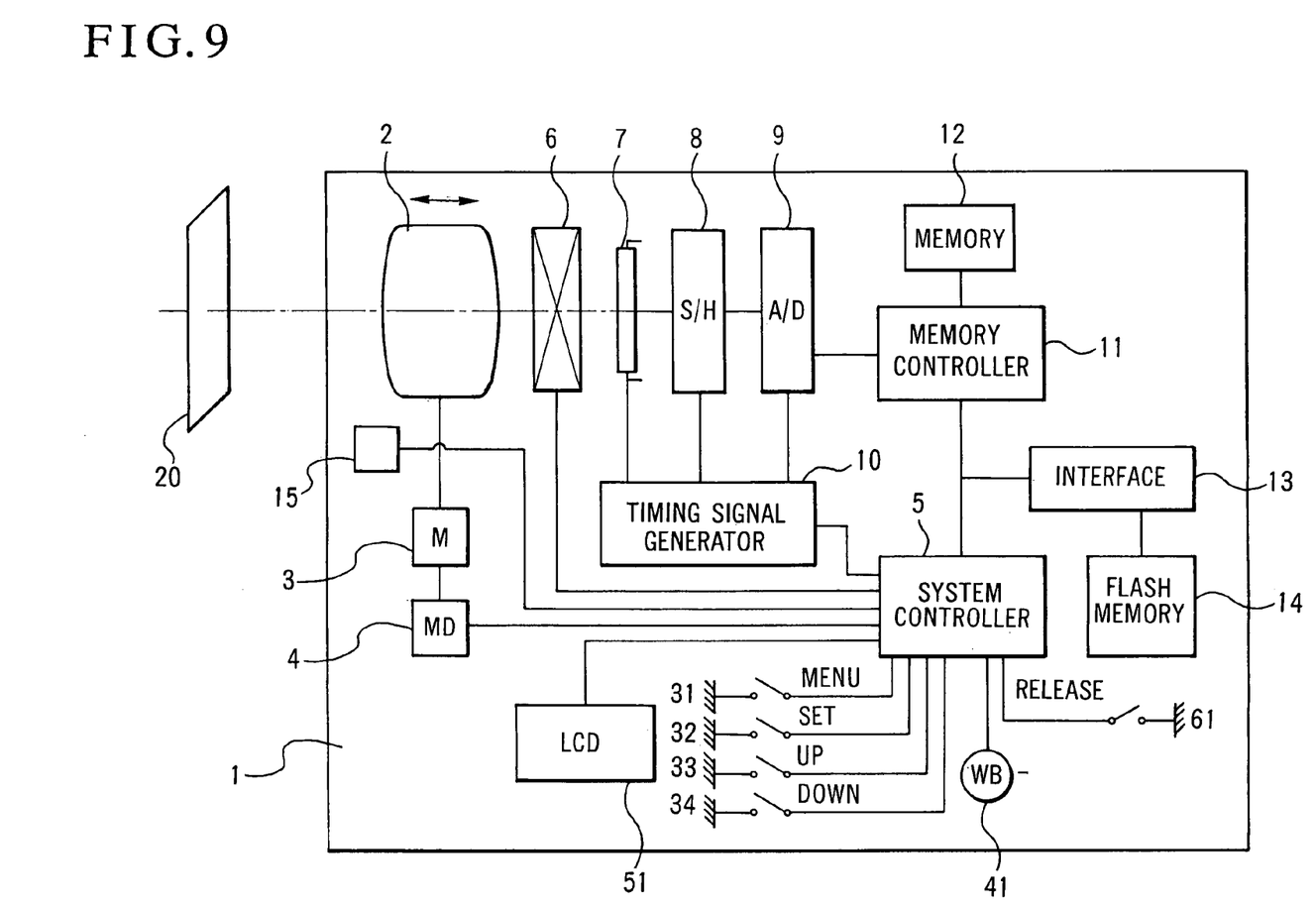
FIG. 9 is a block diagram showing the arrangement of essential parts of an electronic camera according to a fourth embodiment of the invention.

FIG. 9 is a block diagram showing the arrangement of the electronic camera according to the fourth embodiment of the invention. The construction of the electronic camera shown in FIG. 9 is obtained by adding the distance measuring sensor 15 to the construction of the electronic camera shown in FIG. 1. In FIG. 9, parts other than the distance measuring sensor 15 are the same as those shown in FIG. 1, and are, therefore, omitted from the description here.

Figure 10:
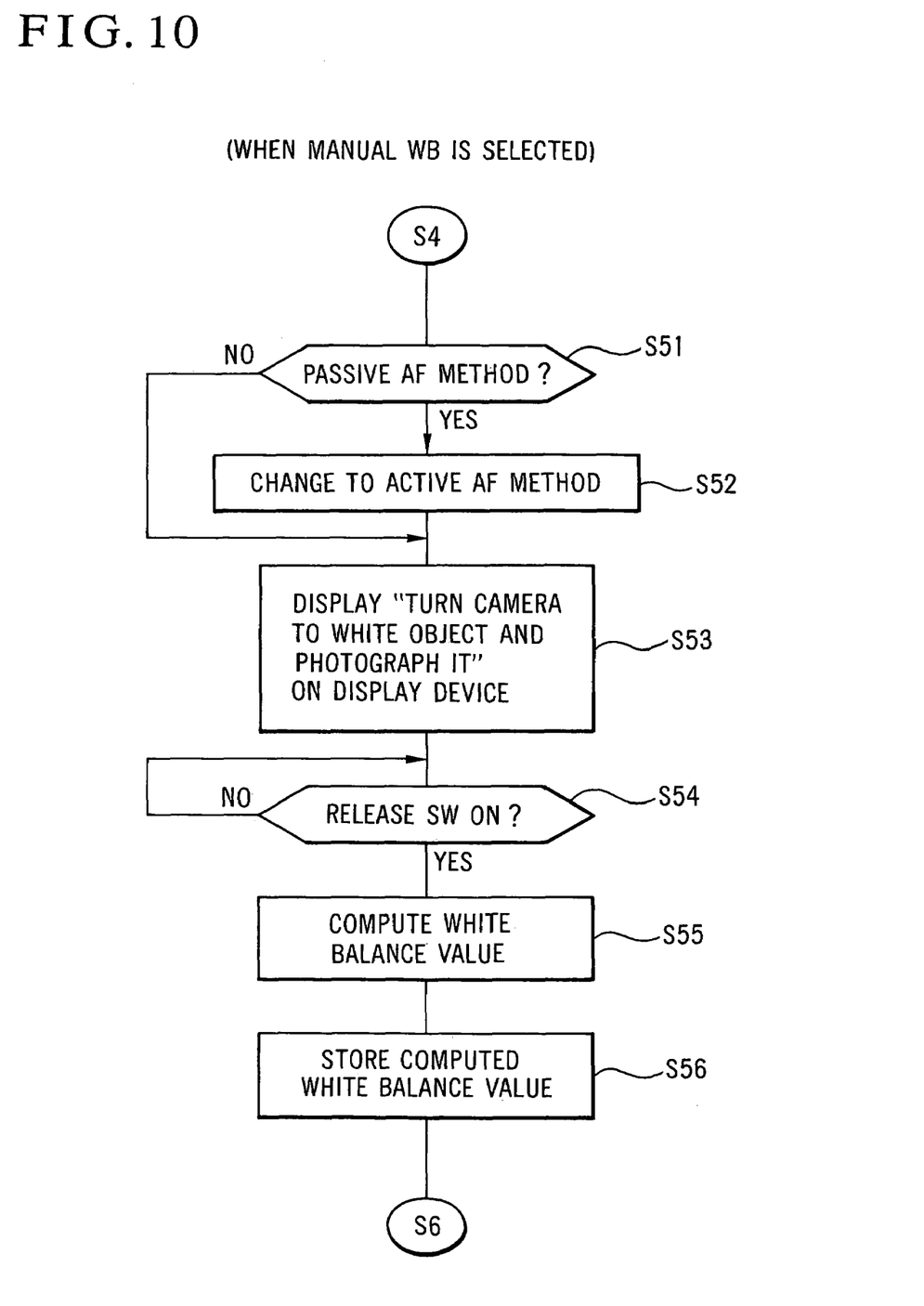
FIG. 10 is a flow chart showing the flow of a manual white balance inputting process in the electronic camera according to the fourth embodiment of the invention.

FIG. 10 is a flow chart showing the procedure for inputting white balance data in the manual white balance mode according to the fourth embodiment.

Referring to the flow chart of FIG. 5, with the item "input of manual WB" in the menu selected, when the setting switch 32 is turned on (step S4), the flow proceeds to step S51 in the flow chart of FIG. 10.

In step S51, a check is made to find if an automatic focusing method as currently selected is the passive AF method. If so, the flow proceeds to step S52, where the automatic focusing method is changed over to the active AF method.

Upon completion of the focusing operation with the active AF method, the flow proceeds to step S53. In step S53, the display device 51 is caused to display, for example, such a message as "turn camera to white object and photograph it", as shown in FIG. 3, so as to urge the photographer to input WB data. In this instance, the photographer puts a white sheet of paper or the like in front of the photographic lens 2 of the electronic camera 1 under photographic light, and photographs the white sheet of paper or the like by depressing the release switch 61.

If it is found in step S54 that the release switch 61 is turned on, a white balance value to be used as a reference value for white balance is computed from a picked-up white image in step S55. Then, in step S56, the computed white balance value is stored in the memory 12.

According to the fourth embodiment described in the foregoing, in a case where the manual white balance mode is selected and the image of a white sheet of paper or the like is picked up, the automatic focusing mechanism is changed over to the active AF method. Accordingly, the photographing operation for obtaining WB data can be completed for a short time.

Each of the above-described embodiments can be achieved, as an example, by supplying a system or an apparatus with a storage medium in which program codes of the software that implements the above-described capabilities of each of the embodiments are stored, and making a computer (or a CPU or an MPU) of the system or the apparatus read and execute the program codes stored in the storage medium.

In this case, the program codes themselves read from the storage medium realize the above-described capabilities of each of the embodiments, and, hence, the storage medium storing the program codes constitutes the present invention.

As a storage medium for supplying program codes, for example, a floppy disk, a hard disk, an optical disk, a magneto-optical disk, a CD-ROM, a CD-R, a magnetic tape, a nonvolatile memory card or a ROM can be employed.

The realization of the above-described capabilities of each of the embodiments is based not only on the executing of the program codes read by a computer, but also on the practical processing a part of which or the whole of which is executed by an OS (operating system) or the like operating on the computer in accordance with the instructions of the program codes.

Moreover, the realization of the above-described capabilities of each of the embodiments is also based on the practical processing a part of which or the whole of which is executed by a CPU or the like provided in a function extension board inserted into a computer or a function extension unit connected to the computer, in accordance with the instructions of the program codes read from the storage medium, after the program codes have been written into a memory provided in the function extension board or the function extension unit.

When each of the embodiments is applied to the above-described storage medium, program codes corresponding to each of the above-described flow charts are stored in the storage medium. That is, a module indispensable for the electronic camera according to each of the embodiments is stored in the storage medium.

The invention claimed is:

1. A camera comprising:
   a white balance correcting circuit for correcting white balance of a picked-up image by picking up an image of first object on the basis of white balance data obtained by picking up an image of second object;
   a focusing circuit arranged to drive a lens, wherein said lens is used for a focusing operation; and
   a control circuit for controlling to pick up the image of the second object without driving said lens used for said focusing operation after operation for picking up said image of said second object is selected by a user.

2. A camera according to claim 1, the second object is white in color.

3. A camera according to claim 1, further comprising:
   an operation element by which a user selects at least a first mode and a second mode;
   wherein said first mode is a mode in which said white balance correcting circuit corrects white balance of a picked-up image by picking up an image of third object on the basis of white balance data corresponding to a light source, which has been beforehand prepared, and said second mode is a mode in which said white balance correcting circuit corrects said white balance of said picked-up image by picking up said image of said first object on the basis of said white balance data obtained by picking up said image of said second object,
   a second control circuit for displaying a screen used for picking up an image of said second object in a display in said camera.

4. A camera according to claim 3, further comprising:
   a release switch, for picking up said image of said first object, which is operated by a user;
   a third control circuit for operating said focusing circuit and then picking up said image of said first object according to operation of said release switch.

5. A camera according to claim 4, wherein said image of said second object is picked up by operation of said release switch in said second mode.

6. A control method for controlling a camera having a focusing circuit arranged to drive a lens, wherein said lens is used for a focusing operation, said control method comprising the steps of:
   correcting white balance of a picked-up image by picking up an image of first object on the basis of white balance data obtained by picking up an image of second object;
   controlling to pick up the image of the second object without driving said lens used for said focusing operation after operation for picking up said image of said second object is selected.

* * * * *